United States Patent
Taya et al.

(10) Patent No.: US 12,472,909 B2
(45) Date of Patent: Nov. 18, 2025

(54) JACK, VEHICLE, AND JACK-UP SYSTEM

(71) Applicant: TOYOTA JIDOSHA KABUSHIKI KAISHA, Aichi-ken (JP)

(72) Inventors: Hironari Taya, Toyota (JP); Tadashi Matsuura, Toyota (JP); Shinichiro Noda, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 251 days.

(21) Appl. No.: 18/306,185

(22) Filed: Apr. 24, 2023

(65) Prior Publication Data

US 2023/0339438 A1    Oct. 26, 2023

(30) Foreign Application Priority Data

Apr. 26, 2022 (JP) ................. 2022-072688

(51) Int. Cl.
*B60S 9/10* (2006.01)
*B66F 3/35* (2006.01)

(52) U.S. Cl.
CPC . *B60S 9/10* (2013.01); *B66F 3/35* (2013.01)

(58) Field of Classification Search
CPC .... B60S 9/10; B60S 9/20; B66F 3/365; B66F 3/40; B66F 3/35
See application file for complete search history.

(56) References Cited

U.S. PATENT DOCUMENTS

| | | | | |
|---|---|---|---|---|
| 3,719,299 | A * | 3/1973 | Oehler | B60P 1/6427 414/498 |
| 4,542,882 | A * | 9/1985 | Choe | B66F 3/35 254/93 HP |
| 4,938,305 | A * | 7/1990 | Park | B60S 9/215 180/199 |
| 8,302,934 | B1 * | 11/2012 | Woods | B66F 3/35 254/8 B |
| 2016/0200557 | A1 * | 7/2016 | Cho | B60S 9/10 254/93 H |
| 2021/0284057 | A1 * | 9/2021 | Belliveau | B60S 9/10 |
| 2023/0339438 | A1 * | 10/2023 | Taya | B66F 3/35 |

FOREIGN PATENT DOCUMENTS

JP            200738918 A      2/2007

* cited by examiner

*Primary Examiner* — Lee D Wilson
(74) *Attorney, Agent, or Firm* — HAUPTMAN HAM, LLP

(57) ABSTRACT

The jack includes an upper support portion (upper plate) fixed to the lower portion of the vehicle body, and an airbag provided below the upper support portion (upper plate) and inflated and deployed by the supply of gas. According to the jack, the airbag is inflated and deployed under the vehicle body by the supply of the gas. When the gas is further supplied to the airbag in contact with the ground, the vehicle body fixed to the upper support portion (upper plate) is lifted. When the vehicle body is lifted in this manner, the state of contact between the wheels and the ground is changed, and the vehicle can escape from the stacked state.

5 Claims, 7 Drawing Sheets

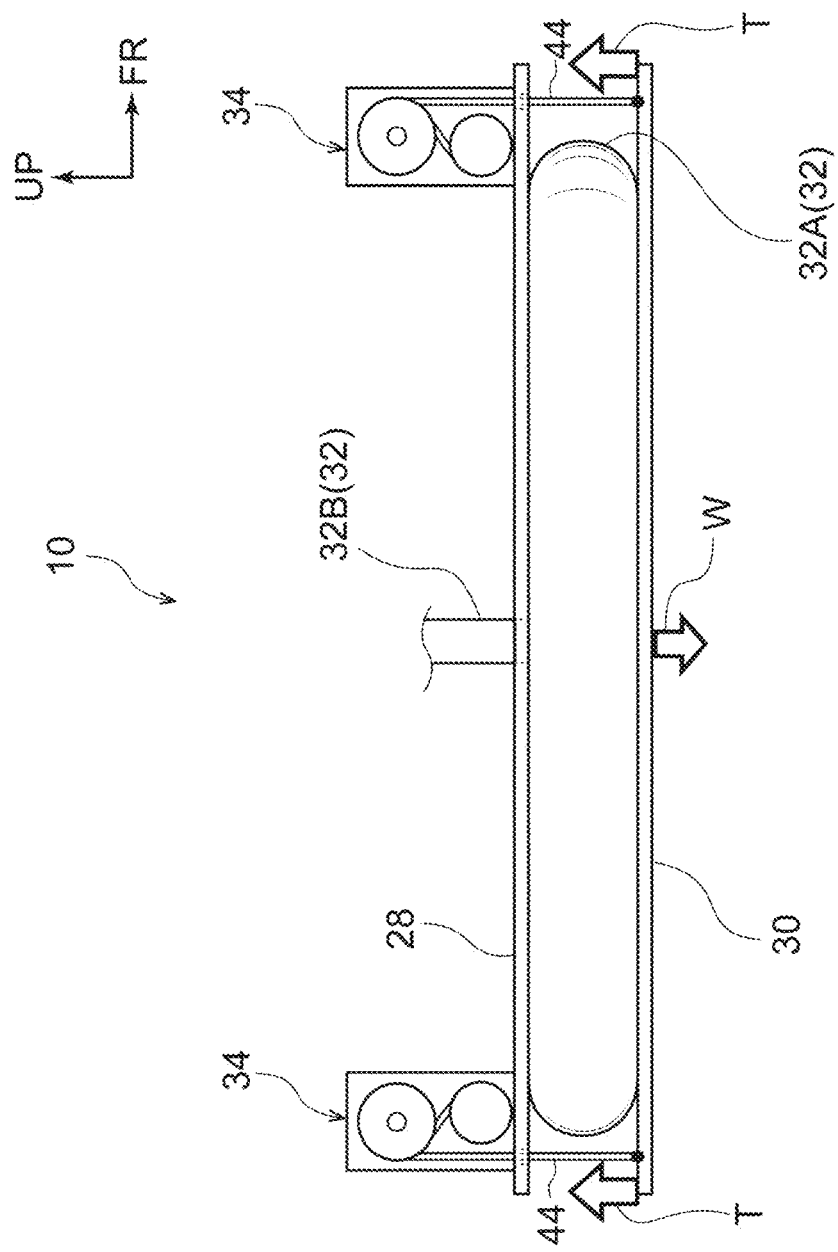

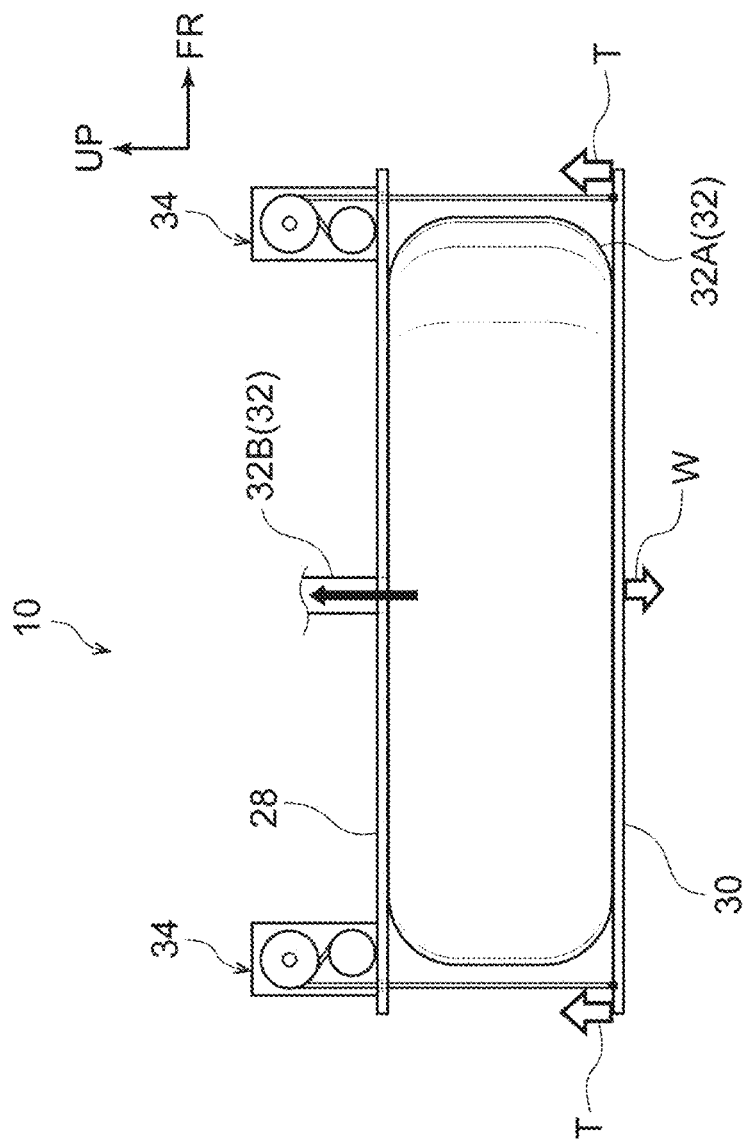

JACK, VEHICLE, AND JACK-UP SYSTEM

CROSS-REFERENCE TO RELATED APPLICATION

This application claims priority to Japanese Patent Application No. 2022-072688 filed on Apr. 26, 2022, incorporated herein by reference in its entirety.

BACKGROUND

1. Technical Field

The present disclosure relates to a jack, a vehicle, and a jack-up system.

2. Description of Related Art

When a vehicle travels on a sandy ground, a snowy road, a muddy road, or the like, the vehicle may be unable to travel due to idling of wheels. In addition, the vehicle may be unable to travel due to the wheels running off the road. It is desirable to be able to quickly and easily escape from a so-called "stuck state" in which the vehicle is unable to travel as described above. For this reason, a technique has been proposed in which a device that assists escape from a stuck state is mounted on a vehicle.

Japanese Unexamined Patent Application Publication No. 2007-038918 (JP 2007-038918 A) discloses a stuck escape assistance device that, when a vehicle is in a stuck state, raises and lowers a vehicle height by using an absorber unit to assist escape from the stuck state. In this stuck escape assistance device, the vehicle height is lowered by the absorber unit, so that the vehicle is supported at the bottom of the vehicle body, and the wheels are pulled up from the sandy road. Next, the wheels are pushed down against the sandy road, so that the bottom of the vehicle body is separated from the sandy road. As described above, the stuck escape assistance device of JP 2007-038918 A is configured to change the grip property of the wheels with respect to the sandy road by changing the state of contact between the wheels and the sandy road, thereby assisting the escape from the stuck state. Therefore, the stuck escape assistance device can save the trouble of disposing and removing a device such as a jack under the vehicle body when the vehicle is in a stuck state.

SUMMARY

However, in the stuck escape assistance device described in JP 2007-038918 A, since the vehicle height is moved up and down by using the absorber unit, it is difficult to cope with a case where it is difficult to escape from the stuck state unless the vehicle body is jacked up high, such as a case where the wheels are stuck deeply within the road surface or when the wheels run off the road, and thus there is room for improvement.

In view of the above, an object of the present disclosure is to provide a jack and a jack-up system capable of quickly and easily assisting escape from a stuck state of a vehicle, and a vehicle capable of quickly and easily escaping from the stuck state.

A jack includes: an upper support portion fixed to a lower part of a vehicle body; and an airbag provided below the upper support portion to be inflated and deployed by supply of gas.

According to the present disclosure, the airbag is inflated and deployed under the vehicle body by the supply of gas. When the gas is further supplied to the airbag in contact with the ground, the vehicle body fixed to the upper support portion is lifted.

When the vehicle body is lifted in this manner, the state of contact between the wheels and the ground is changed, allowing the vehicle to escape from the stuck state. Therefore, it is not necessary for the occupant to separately install a general jack under the vehicle body, and the vehicle can quickly and easily escape from the stuck state. Note that the term "stuck state" as used herein shall include both situations where the wheels idle on a road surface such as sandy ground, snowy road, muddy road, etc. and where the wheels become unable to travel due to the wheels running off the road. Examples of a change in the state of contact between the wheels and the ground include a case where the sand enters under the lifted wheels, a case where a wheel caught in the side groove comes out, and the like. The term "ground" as used herein is not limited to the ground surface of the earth, and includes the ground surface of other planets such as Mars and the ground surface of satellites such as the moon surface.

The jack further includes: a lower support portion provided below the airbag; and an urging portion that connects the upper support portion and the lower support portion and that urges the lower support portion toward the upper support portion side, in which the airbag is deflated by exhaust of the gas.

According to the present disclosure, when gas is exhausted from the airbag, the airbag is deflated. Here, the lower support portion is connected to the upper support portion in a state of being urged toward the upper support portion side by the urging portion. Therefore, the lower support portion is pulled toward the upper support portion side as the airbag is deflated. As described above, the airbag is deflated and the lower support portion is pulled toward the upper support portion side by the exhaust of the gas, so that the jack is automatically stored.

In the jack, the urging portion urges the lower support portion toward the upper support portion side by a force smaller than a force acting on the lower support portion in a direction away from the upper support portion when the airbag is inflated and deployed.

According to the present disclosure, when the airbag is inflated and deployed, the lower support portion is pushed downward by a force larger than a force pulling toward the upper support portion side by the urging portion. As a result, the airbag is deployed without being hindered by the urging force of the urging portion.

In the jack, the urging portion includes a constant load spring that urges the lower support portion toward the upper support portion side by a constant force.

According to the present disclosure, the lower support portion is urged toward the upper support portion side by a constant force by a constant load spring. When the airbag is not inflated and deployed, the lower support portion is pulled toward the upper support portion side by the urging portion including the constant load spring. When the gas is supplied to the airbag, a force larger than the output of the urging portion including the constant load spring acts in a direction away from the upper support portion, and the airbag is deployed. On the other hand, when the airbag is deflated, the lower support portion is again pulled toward the upper support portion side by the output of the urging portion including the constant load spring.

Here, when the lower support portion is urged toward the upper support portion side by using a general wire spring, the urging force increases as the distance between the upper support portion and the lower support portion increases due to inflation of the airbag. Therefore, a long and heavy wire spring having a low spring constant is required in order to perform urging without hindering the inflation and deployment of the airbag with a required stroke by using the wire spring. When a jack provided with such a long and heavy wire spring is fixed to the lower part of the vehicle body, there is a problem that the vehicle becomes heavy and the ground height of the vehicle body becomes low, which hinders the traveling.

On the other hand, when the lower support portion is urged toward the upper support portion side by using the constant load spring, the lower support portion is urged with a constant force by the constant load spring even if the distance between the upper support portion and the lower support portion changes with the inflation and deflation of the airbag. Therefore, the jack can be stored along with the deflation of the airbag with a simple configuration.

In the jack, the lower support portion is sized to cover the inflated and deployed airbag in a bottom view.

According to the present disclosure, since the bottom surface side of the airbag is covered by the lower support portion, the inflated and deployed airbag can be suppressed from being damaged by being in contact with the ground.

A vehicle includes: the jack; an air supply portion able to supply the gas to the airbag; an exhaust portion able to exhaust the gas from the airbag; and a valve switchable in at least two directions including an air supply direction in which an air supply flow path for communicating the air supply portion and the airbag is opened and an exhaust direction in which an exhaust flow path for communicating the air exhaust portion and the airbag is opened.

According to the present disclosure, when the valve is switched to the air supply direction, the air supply flow path is opened and the air supply portion and the airbag are communicated with each other. In this state, when the gas is supplied from the air supply portion to the airbag, the jack is deployed. Therefore, an occupant can jack up the vehicle body simply by switching the valve without separately preparing an air supply device such as a compressor or without using exhaust gas by connecting the muffler and the airbag with a duct.

Further, when the valve is switched to the exhaust direction, the exhaust flow path is opened, and the exhaust portion and the airbag are communicated with each other. As a result, the gas is exhausted from the airbag and the jack is stored. That is, the jack can be stored only by switching the valve.

A jack-up system includes: the jack; an air supply portion able to supply the gas to the airbag; an exhaust portion able to exhaust the gas from the airbag; a valve switchable in at least two directions including an air supply direction in which an air supply flow path for communicating the air supply portion and the airbag is opened and an exhaust direction in which an exhaust flow path for communicating the air exhaust portion and the airbag is opened; and a control device that switches the valve to the air supply direction when the vehicle is in a stuck state, and switches the valve to the exhaust direction after deployment of the airbag is completed.

According to the present disclosure, when the valve is switched to the air supply direction by the control device while the vehicle is in a stuck state, the air supply flow path is opened and the air supply portion and the airbag are communicated with each other. In this state, when the gas is supplied from the air supply portion to the airbag, the jack is deployed. Further, when the valve is switched from the air supply direction to the exhaust direction by the control device, the exhaust flow path is opened, and the exhaust portion and the airbag are communicated with each other. As a result, the gas is exhausted from the airbag and the jack is stored. That is, since the jack is automatically deployed and stored, the occupant does not need to work outside the vehicle.

In the jack-up system, the control device switches the valve to the air supply direction prior to moon landing of a vehicle used on a moon surface, and switches the valve to the exhaust direction after the moon landing of the vehicle.

According to the present disclosure, at the time of moon landing of a vehicle, an impact of landing is absorbed by the airbag.

As described above, the jack according to the present disclosure has an excellent effect that is it possible to quickly and easily assist escape from the stuck state of the vehicle.

The jack according to the present disclosure has an excellent effect of allowing the occupant to save the trouble of collecting the jack after use.

The jack according to the present disclosure has an excellent effect that the jack can be reliably deployed.

The jack according to the present disclosure has an excellent effect that it is possible to assist the escape from the stuck state with a lightweight and compact configuration.

The jack according to the present disclosure has an excellent effect that the durability of the airbag can be improved.

The vehicle according to the present disclosure has an excellent effect that the jack can be deployed and stored only by switching the valve.

The jack-up system according to the present disclosure has an excellent effect that the vehicle body can be jacked up without the occupant coming out of the vehicle.

The jack-up system according to the present disclosure has an excellent effect that it is possible to quickly and easily assist the escape from the stuck state and to suppress an impact on an occupant and damage to a vehicle at the time of moon landing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a side view of the jack shown in FIG. 2 in a stowed state;

FIG. 7 is a view showing a condition in which the lower plate is pulled up by discharging the gases from the airbag shown in FIG. 6B.

DETAILED DESCRIPTION OF EMBODIMENTS

Hereinafter, a vehicle 14 on which a jack-up system 12 including a jack 10 according to an embodiment of the present disclosure is mounted will be described with reference to FIGS. 1 to 7. Incidentally, the arrow FR shown as appropriate in the figures, arrow UP, arrow LH, arrow RH and arrow OUT, respectively front side of the vehicle 14, the upper side, the lateral direction (width direction) left side, shows the lateral direction (width direction) right side and width direction outer. In addition, in the following description, when the front, rear, up, down, and left and right directions are used without special mention, the front and rear directions in the vehicle front-rear direction, the up and down directions in the vehicle up-down direction, and the left and right directions (width directions) in the vehicle left-right direction are respectively indicated. Hereinafter, the arrangement of the jack 10 and the structure of the jack 10 in the vehicle 14 will be described, and then the jack-up system 12 will be described.

Placement of Jack 10

Figure 1:
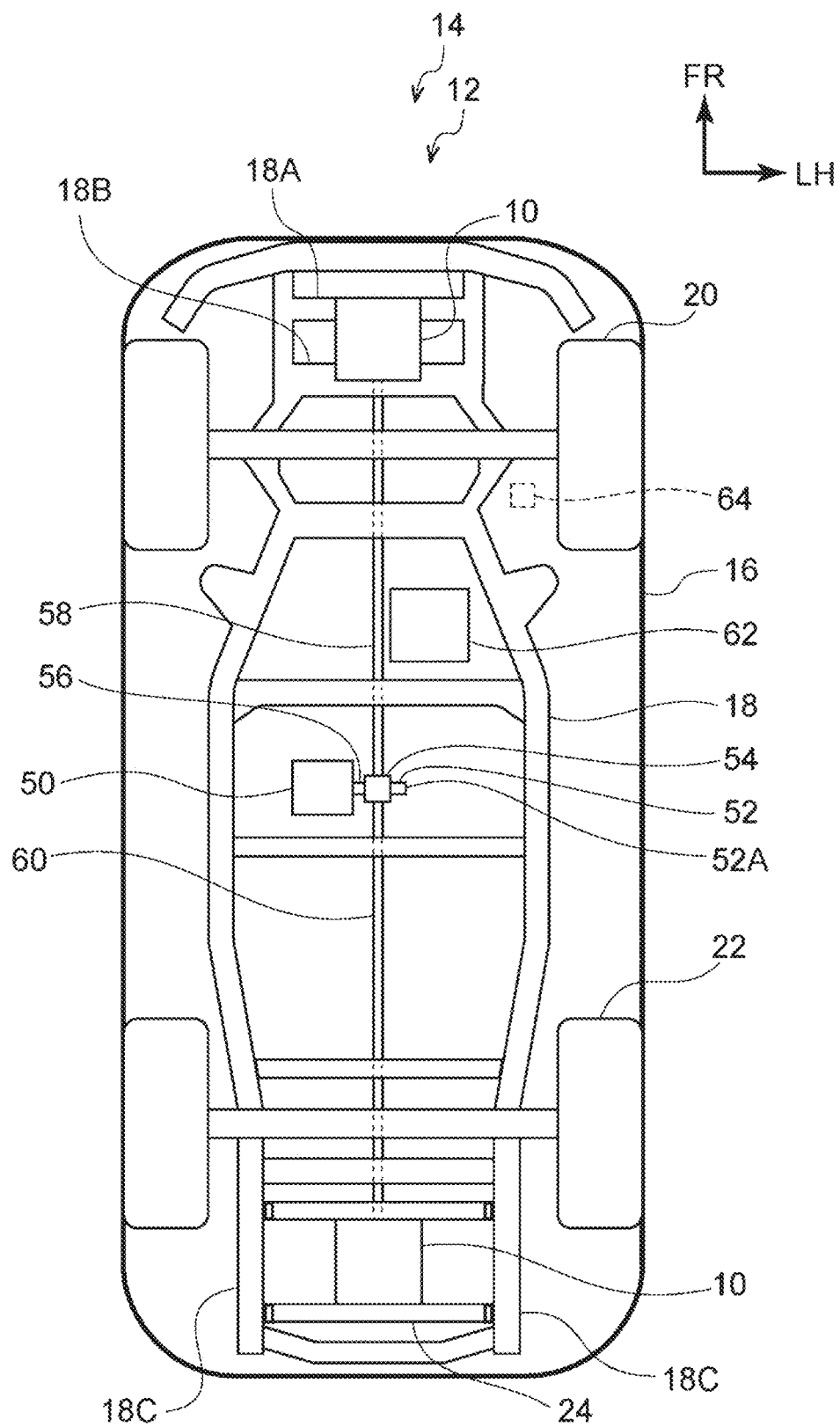
FIG. 1 is a bottom view of a vehicle equipped with a jack and a jack-up system according to the present embodiment.

As shown in FIG. 1, the jack 10 is provided at the front lower portion and the rear lower portion of the vehicle body 16, respectively, at the center portion in the width direction of the vehicle 14. The vehicle 14 is, for example, a four-wheel drive vehicle having a ladder frame 18. The vehicle 14 is not limited to a four-wheel drive vehicle, and may be a front-wheel drive vehicle or a rear-wheel drive vehicle. In the case of a front wheel drive vehicle, the jack 10 is preferably provided at least on the rear side, and in the case of a rear wheel drive vehicle, the jack 10 is preferably provided at least on the front side. The number of wheels is not limited to four wheels. Further, the vehicle 14 may have a monocoque structure.

The ladder frame 18 includes a front-side front cross member 18A and a rear-side front cross member 18B extending in the widthwise direction on the front side of the front wheel 20 in a plan view. The front jack 10 is fixed to the lower side of the front-side front cross member 18A and the rear-side front cross member 18B. Further, the ladder frame 18 includes a pair of left and right rear side member 18C extending in the front-rear direction on the rear side of the rear wheel 22 in a plan view. A reinforcing frame 24, which will be described later, is provided between the pair of left and right rear side member 18C in the bottom view, and the jack 10 on the rear side is fixed to the lower side of the reinforcing frame 24. The number and arrangement of the jacks 10 are not limited to the above, and for example, the jacks 10 may be provided only on the front side or the rear side, or a pair of left and right sides may be provided. The jack 10 may be provided in the vicinity of each tire.

Figure 2:
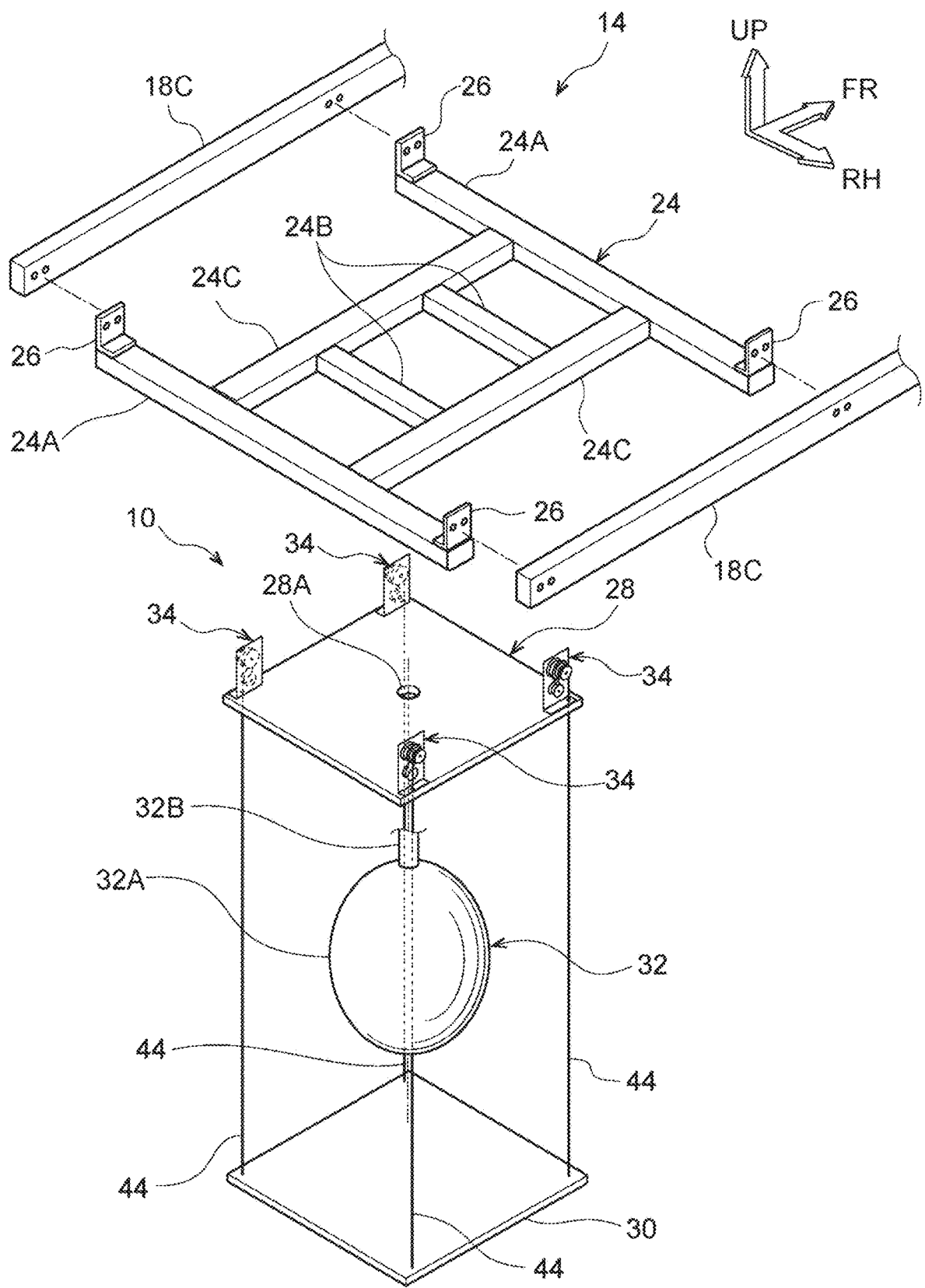
FIG. 2 is an exploded perspective view of the jack shown in FIG. 1.

As shown in FIG. 2, the pair of left and right rear side member 18C are connected by a reinforcing frame 24 formed in a ladder shape in a plan view. The reinforcing frame 24 includes a pair of front and rear cross frame 24A extending in the vehicle width direction, a pair of front and rear center frame 24B extending in the vehicle width direction between the pair of front and rear cross frame 24A, and a pair of left and right side frame 24C connecting the left and right end portions of the center frame 24B and the left and right intermediate portions of the cross frame 24A in the front-rear direction.

In the reinforcing frame 24, the cross frame 24A is fixed to the rear side member 18C via brackets 26 formed in a substantially L-shape when viewed from the vehicle front-rear direction. Specifically, the bottom portions of the brackets 26 formed in a substantially rectangular plate shape in plan view are fastened to the upper surfaces of the left and right end portions of the cross frame 24A. In addition, a side portion of the bracket 26, which is substantially rectangular plate-shaped in a side view and is erected from the outer side in the vehicle width direction of the bottom portion, is fastened to the inner side surface in the width direction of the rear side member 18C. The jack 10 is fixed to the lower side of the vehicle body 16 via the reinforcing frame 24 fixed to the rear side member 18C as described above. The method of attaching the jack 10 to the lower portion of the vehicle body 16 is not limited to the above, and for example, the jack 10 may be fixed to the floor panel of the vehicle.

Structure of Jack 10

Hereinafter, the structure of the rear jack 10 will be described in detail. Note that the jack 10 on the front side (see FIG. 1) is configured similarly to the jack 10 on the rear side, and thus description thereof will be omitted.

Upper Plate 28, Lower Plate 30, and Airbag 32

The jack 10 includes an upper plate 28 as an upper support portion fixed to a lower portion of the vehicle body 16, a lower plate 30 as a lower support portion provided to face the upper plate 28, and a single bag-shaped airbag 32 provided between the upper plate 28 and the lower plate 30. The upper plate 28 and the lower plate 30 are each formed in a square shape in plan view. The airbag 32 is folded and disposed between the upper plate 28 and the lower plate 30 in the accommodated state of the jack 10 (see FIG. 5). As an example, the upper plate 28 and the lower plate 30 are made of metal, and the airbag 32 is made of resin. The materials of the upper plate 28, the lower plate 30, and the airbag 32 are not limited to those described above. In addition, the upper plate 28 and the lower plate 30 are not limited to a square shape in plan view, and may be formed in, for example, a circular shape. Further, the airbag 32 is not limited to a single bag shape, and may include a plurality of chambers.

The airbag 32 includes an airbag main body 32A formed in a substantially cylindrical bag shape in an inflated and deployed condition, and a cylindrical ventilation portion 32B connected to an upper end portion of the airbag main body 32A. The airbag 32 is configured to be capable of supplying gas to the airbag main body 32A via the ventilation portion 32B and discharging gas from the airbag main body 32A. The bottom surface of the airbag main body 32A is bonded to the upper surface of the central portion of the lower plate 30. The lower plate 30 is sized to cover the airbag 32 inflated and deployed in the bottom view. The airbag main body A is not limited to a substantially cylindrical shape, and may be formed in a bag shape such as a substantially quadrangular prism shape, a spherical shape, or a long spherical shape.

In the upper plate 28, a ventilation portion insertion hole 28A having a circular shape in a plan view is formed in a central portion in the front-rear direction and the left-right direction so as to penetrate therethrough in the up-down direction. The ventilation portion 32B of the airbag 32 is inserted into the ventilation portion insertion hole 28A. In the upper end portion of the airbag main body 32A, the peripheral edge portion of the lower end portion of the ventilation portion 32B is bonded to the lower surface of the upper plate 28. Note that the airbag 32 may not be bonded to the upper plate 28. Further, the ventilation portion 32B is not limited to a configuration that is connected to the upper end portion of the airbag main body 32A and passes through the upper plate 28, but may be provided in, for example, a vertical central portion of the airbag 32 and extends in a substantially horizontal direction through a space between the upper plate 28 and the lower plate 30.

Constant Load Spring 34

The jack 10 further comprises a constant load spring 34 as four urging portions. Each constant load spring 34 is fixed to an upper side of a corner portion of the upper plate 28. The constant load spring 34 includes a bracket 36 (see FIG. 3) fixed to the upper plate 28 and the reinforcing frame 24, respectively.

Figure 3:
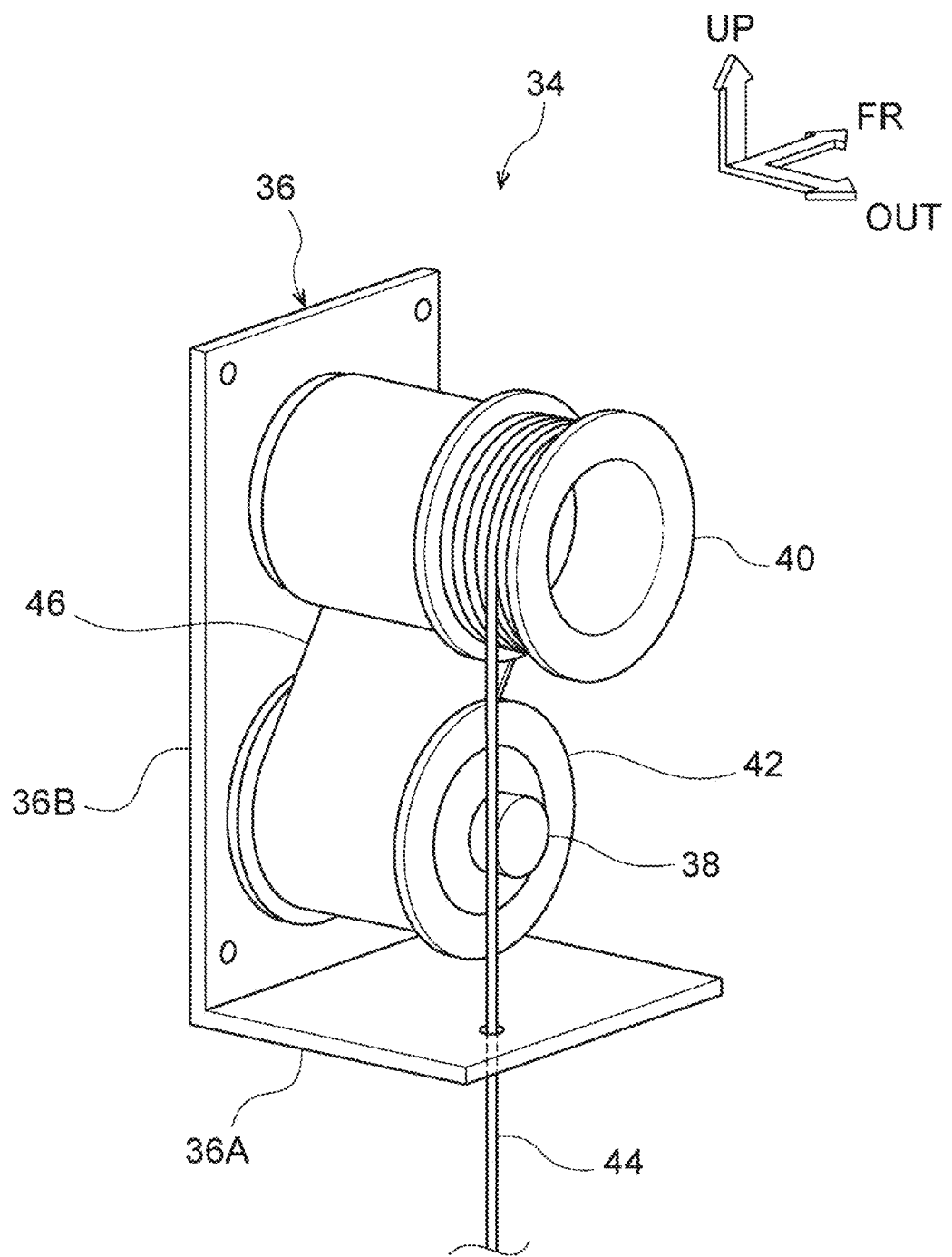
FIG. 3 is a perspective view of the constant load spring shown in FIG. 2.

As shown in FIG. 3, the brackets 36 are formed in a substantially L-shape when viewed from the front-rear direction, and include a bottom 36A having a substantially rectangular plate shape in plan view, and a side portion 36B erected from an inner end portion of the bottom 36A in the vehicle-width direction. The bottom 36A is fixed to a corner of the upper surface of the upper plate 28 (see FIG. 2). The side portion 36B is fixed to the vehicle-width-direction outer side of the side frame 24C (see FIG. 2) of the reinforcing frame 24.

The constant load spring 34 includes an upper shaft (not shown) and a lower shaft 38 whose one end portion is fixed to the side portion 36B of the bracket 36 and extends in the vehicle-width-direction, a substantially cylindrical upper drum 40 pivotally supported by the upper shaft, and a lower drum 42 pivotally supported by the lower shaft 38. As described above, the upper drum 40 and the lower drum 42 are rotatably attached to the side portion 36B of the brackets 36 with the vehicle-width direction as an axial direction.

The constant load spring 34 further includes a wire 44 having one end fixed to the upper drum 40 and wound around the upper drum 40, and a metal thin plate 46 having one end fixed to the upper drum 40 and the other end fixed to the lower drum 42 and wound around the upper drum 40 and the lower drum 42, respectively.

A wire insertion hole (not shown) having a circular shape in plan view is formed in a corner portion of the upper plate 28 (see FIG. 2). The wire 44 of the constant load spring 34 has one end fixed to the upper drum 40 and the other end (lower end) fixed to the corner of the lower plate 30 (see FIG. 2) in a state of being inserted into the wire insertion hole. That is, when the lower plate 30 (see FIG. 2) is lowered, the four wires 44 are pulled out from the upper drum 40. In other words, as shown in FIG. 2, the upper plate 28 and the lower plate 30 are connected by the constant load spring 34. Although the constant-load spring 34 has been described as being provided at four positions on the outside of the airbag 32 formed in the shape of a bag, that is, at four corners of the upper plate 28 and the lower plate 30, the arrangement of the constant-load spring is not limited thereto. For example, in a state in which the airbag is inflated and deployed, the airbag may be formed in a substantially cylindrical bag shape having a center penetrating therethrough in a plan view, and an urging portion may be provided so as to pass through the center of the substantially cylindrical airbag.

Here, as shown in FIG. 3, in the upper drum 40, the wire 44 is wound in a direction opposite to the direction in which the thin plate 46 is wound. That is, when the wire 44 is pulled out from the upper drum 40, the upper drum 40 rotates, and the thin plate 46 is wound around the upper drum 40. At this time, the thin plate 46 is pulled out from the lower drum 42, but is biased in the opposite direction by the action of the spring, i.e., in the direction taken up by the lower drum 42. At this time, the wire 44 is biased in a direction to be wound on the upper drum 40. That is, in a state in which the wire 44 is pulled out, the lower plate 30 is biased toward the upper plate 28 by the constant load spring 34. Note that the configuration of the constant load spring 34 is not limited to the above.

Figure 4:
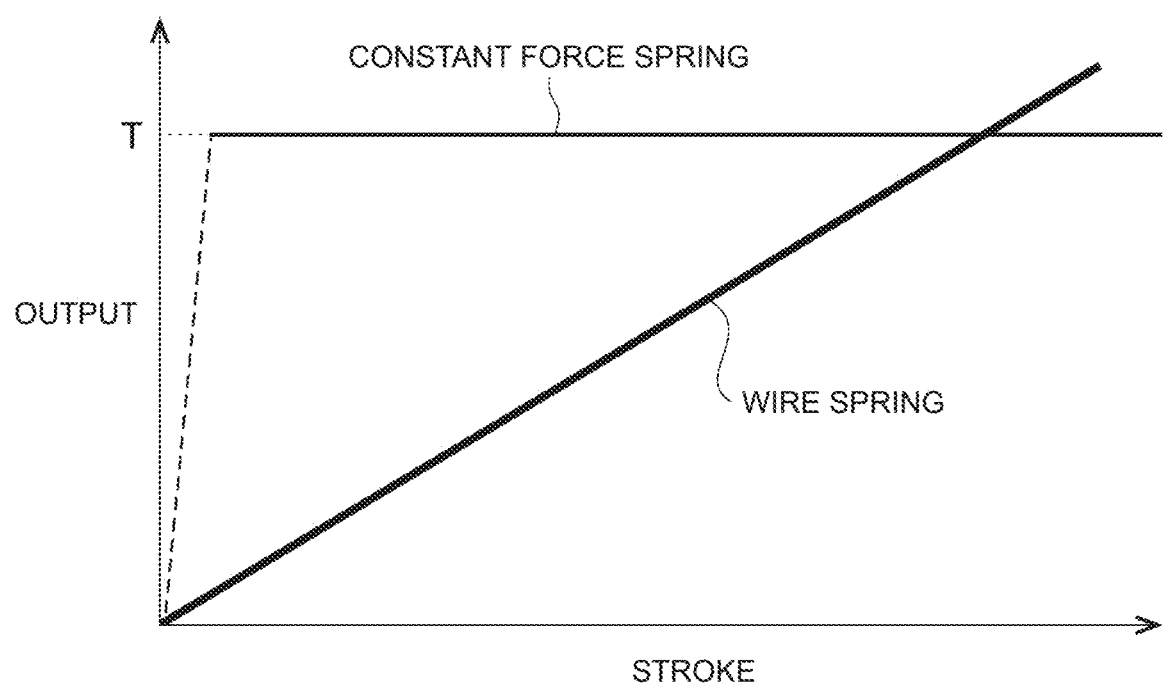
FIG. 4 is a graph comparing the output for the stroke of the constant load spring shown in FIG. 3 with the output for the stroke of a typical wire spring.

Here, as shown in FIG. 4, the output of a general wire spring increases in proportion to the stroke. On the other hand, the constant-load spring 34 (see FIG. 3) is configured to have a stroke to the length limit of the wire 44 (see FIG. 3) when a load exceeding the output T is applied, and acts at a constant output T for a predetermined stroke or more.

As shown in FIGS. 5 to 7, each constant load spring 34 pulls the lower plate 30 toward the upper plate 28 at a constant output T. The force acting in the direction in which the lower plate 30 is pulled toward the upper plate 28 by the four constant load springs is a force larger than the force W acting in the downward direction with respect to the lower plate 30 when the airbag 32 is not inflated and deployed. Here, the force W acting downward with respect to the lower plate 30 when the airbag 32 is not inflated and deployed includes the weight of the lower plate 30 and the load received from the deflated airbag 32.

Figure 6A:
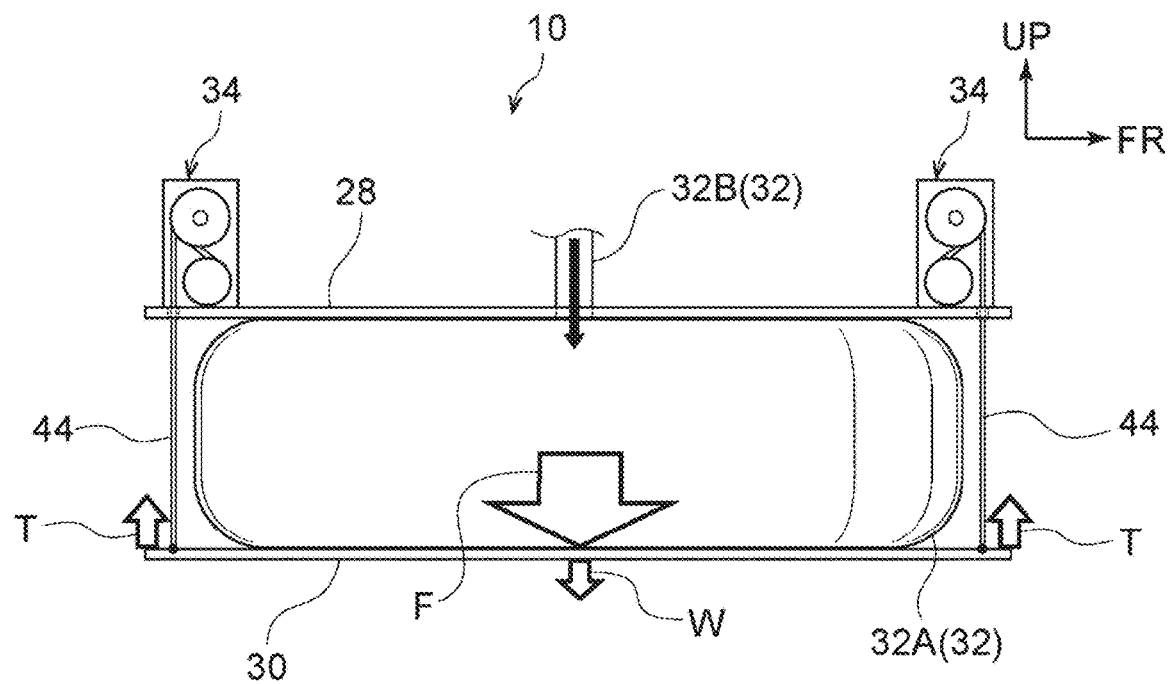
FIG. 6A is a side view of the jack shown in FIG. 5 with the airbag inflated and deployed and shows the jack where the airbag is inflated and deployed.
Figure 6B:
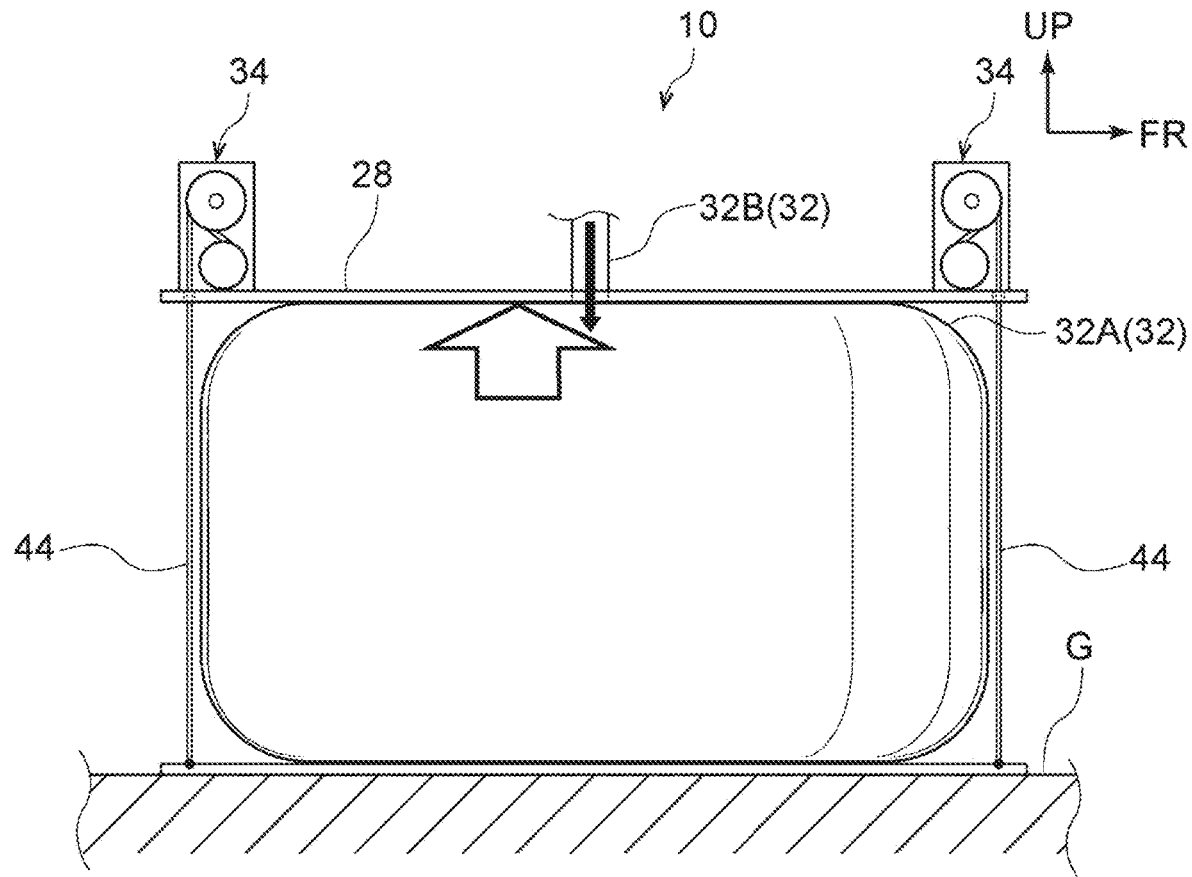
FIG. 6B is a side view of the jack shown in FIG. 5 with the airbag inflated and deployed and is a view showing a state in which an airbag is further inflated and deployed and a jack is brought into contact with a ground.

In FIG. 6A, the airbag 32 is shown in the middle of being supplied with gases. At this time, a downward force F is applied to the lower plate 30 from the inflated and deployed airbag 32. The four constant load springs 34 urge the lower plate 30 toward the upper plate 28 with a force smaller than a force acting on the lower plate 30 in a direction away from the upper plate 28 when the airbag 32 is inflated and deployed. In other words, when the airbag 32 is inflated and deployed, the downward force acting on the lower plate 30 is larger than the upward force acting on the lower plate 30 by the four constant load springs 34 due to the inflation and deployment of the airbag 32 in addition to the weight of the lower plate 30, so that the lower plate 30 is depressed.

Jack-Up System 12

Hereinafter, the jack-up system 12 for deploying and storing the jack 10 will be described with reference to FIG. 1. The jack-up system 12 includes a compressor 50 capable of supplying gas, an exhaust duct 52 capable of exhausting gas from the airbag 32, and a valve 54 capable of controlling the flow of gas at a lower portion of the vehicle body 16.

The compressor 50 and the valve 54 are connected by an air supply duct 56. Further, the valve 54 and a ventilation portion (not shown) of the airbag in the front jack 10 are connected by a front ventilation duct 58. Similarly, the valve 54 and the ventilation portion 32B (see FIG. 2) of the airbag 32 in the rear jack 10 are connected by a rear ventilation duct 60. The compressor 50, the air supply duct 56, the front ventilation duct 58, and the rear ventilation duct 60 correspond to the air supply portions of the present disclosure.

Further, an exhaust duct 52 is connected to the valve 54. One end 52A of the exhaust-duct 52 is open. The exhaust duct 52, the front ventilation duct 58, and the rear ventilation duct 60 correspond to the exhaust portion of the present disclosure. That is, the front ventilation duct 58 and the rear ventilation duct 60 are both ducts for supplying and exhausting the gas supplied to the airbag 32 and the gas exhausted from the airbag 32.

The valve 54 is configured to be capable of switching between an air supply direction, an exhaust direction, and a cutoff direction. The air supply direction is a direction in which a first air supply flow path that communicates the compressor 50 with an airbag (not shown) of the front jack 10 and a second air supply flow path that communicates the compressor 50 with an airbag 32 (see FIG. 2) of the rear jack 10 are opened. In addition, the exhaust direction is a direction in which a first exhaust passage that communicates the exhaust duct 52 with an airbag (not shown) on the front side and a second exhaust passage that communicates the exhaust duct 52 with the airbag 32 on the rear side are opened. Further, the blocking direction is a direction in which the first air supply flow path, the second air supply flow path, the first exhaust flow path, and the second exhaust flow path are all blocked. It should be noted that the valve 54 may be configured to be capable of switching at least the air supply direction and the exhaust direction.

The jack-up system 12 further comprises a control device 62. The control device 62 includes a Read-Only Memory (ROM for storing a program, a Random Access Memory (RAM for temporarily storing data when the program is executed, a Central Processing Unit (CPU for executing the program, and an input/output port. CPU, ROM, RAM and the input/output ports are communicably connected to each other via busses.

The vehicle 14 includes a switch 64 in the vehicle cabin. An input/output port of the control device 62 is electrically connected to the switch 64 and the valve 54. When the vehicle 14 is in a stacked condition, when the occupant switches the switch 64 to the "jack deployment" side, CPU of the control device 62 is configured to switch the valve 54 to the air supply direction, activate the compressor 50, and perform a process of stopping the compressor 50 after a predetermined period of time has elapsed.

Further, when the occupant switches the switch 64 to the "jack storage" side after the deployment of the airbag 32 is completed, CPU of the control device 62 is configured to switch the valve 54 in the exhausting direction and to perform a process of switching the valve 54 in the shut-off direction after a predetermined period of time has elapsed.

Note that the above-described processing is merely an example, and is not limited thereto. For example, CPU of the control device 62 may determine whether or not the vehicles 14 are stacked. In this case, for example, the vehicle 14 is equipped with sensors, cameras, position information acquiring devices, and the like for acquiring information about the vehicle and information about the vehicle, and determines whether or not CPU of the control device 62 is stacked on the basis of the information acquired from these devices. Accordingly, when the vehicle 14 is in the stacked state, the jack 10 is automatically deployed and stored. Therefore, the occupant does not need to operate a switch or the like in the vehicle, and the vehicle 14 can escape from the stacked state even in the case of an autonomous vehicle that travels without manning, for example.

Operation and Effect of this Embodiment

Next, operations and effects of the present embodiment will be described.

According to the jack 10 of the present embodiment, as shown in FIG. 5, the jack 10 is accommodated with the airbag main body 32A contracted. Then, as shown in FIG. 6A, when the gas is supplied to the airbag main body 32A through the ventilation portion 32B, the airbag main body 32A is inflated and the jack 10 is deployed.

As shown in 6B, when the lower plate 30 is contacted with the ground G by inflation and deployment of the airbag main body 32A and the gas is further supplied to the airbag 32, the upper plate 28 is pushed up. Then, the vehicle body 16 (see FIG. 1) fixed to the upper plate 28 is lifted. As described above, when the vehicle body 16 shown in FIG. 1 is lifted, the contacting state between the front wheel 20 or the rear wheel 22 and the ground G (refer to FIG. 6B) is changed, and the vehicle 14 is in a state of being able to escape from the stacked state. Therefore, it is not necessary for the occupant to separately install a general jack under the vehicle body 16, and the vehicle 14 can quickly and easily escape from the stacked state.

In particular, a pair of jacks 10 according to the present embodiment is provided in front and rear directions. Therefore, when the rear-side jack 10 is deployed, the rear portion of the vehicle body 16 is lifted to change the contact state between the rear wheel 22 and the ground G. Further, when the jack 10 on the front side is deployed, the front portion of the vehicle body 16 is lifted to change the contact state between the front wheels 20 and the ground G. Thus, the vehicle 14 can quickly and easily escape from the stacked state regardless of the position of the stacked tires.

Further, since the jack 10 is configured to be jacked up by inflation of the airbag 32, the vehicle body 16 can be jacked up with a lighter weight and a simpler configuration as compared with a mechanical or hydraulic jack. In addition, there is no concern about seizure due to grease consumption, and reusability is excellent.

As shown in FIG. 7, when the gases are exhausted from the airbag 32, the airbag main body 32A is contracted. Here, the lower plate 30 is coupled to the upper plate 28 in a state of being biased toward the upper plate 28 by the constant load spring 34. Therefore, the lower plate 30 is pulled toward the upper plate 28 as the airbag main body 32A contracts. As described above, the airbag main body 32A is contracted by the exhaustion of the gases, and the lower plate 30 is pulled toward the upper plate 28, so that the jack 10 is automatically stored. Therefore, it is possible to save time and effort for the occupant to collect the jack after use. Further, when the jack 10 is not used, it can be compactly stored under the vehicle body 16.

Further, as shown in 6A, when the airbag main body 32A is inflated and deployed, the lower plate 30 is pushed down by a force larger than the force pulled toward the upper plate 28 by the four constant load springs 34. This ensures that the airbag main body 32A is deployed without being hindered by the upward force of the four constant load springs 34.

Further, according to the jack 10 of the present embodiment, the lower plate 30 is always biased toward the upper plate 28 side with a constant force by the four constant load springs 34. Thus, as shown in FIG. 5, when the airbag main body 32A is not inflated and deployed, the lower plate 30 is pulled toward the upper plate 28. As shown in 6A, when the airbag main body 32A is inflated and deployed, a force larger than the sum of the outputs of the four constant load springs 34 is exerted downward, thereby depressing the lower plate 30. Further, as shown in FIG. 7, when the airbag main body 32A is contracted, the lower plate 30 is pulled toward the upper plate 28 by the power of the four constant load springs 34.

Here, when the lower plate 30 is biased toward the upper plate 28 by using a common wire spring, the biasing force increases as the airbag main body 32A expands and the distance between the upper plate 28 and the lower plate 30 increases. Therefore, a long and heavy wire spring having a low spring constant is required to urge the airbag 32 without hindering the inflation and deployment of the airbag with respect to a required stroke. When the jack provided with such a long and heavy wire spring is fixed to the lower part of the vehicle body, there is a problem that the vehicle becomes heavy and the ground height of the vehicle body becomes low, which hinders the traveling.

On the other hand, when the lower plate 30 is biased toward the upper plate 28 by using the constant load spring 34, the lower plate 30 is biased by the constant load spring 34 with a constant force even if the distance between the upper plate 28 and the lower plate 30 changes with the expansion and contraction of the airbag 32. Therefore, the jack 10 can raise and lower the lower plate 30 in accordance with the inflation and deflation of the airbag 32 in a lighter and more compact configuration than in the case of using a general wire spring.

Further, according to the jack 10 of the present embodiment, as shown in 6B, since the bottom surface of the airbag 32 is covered by the lower plate 30, it is possible to suppress the airbag 32 from being damaged by contacting the ground G.

Further, according to the jack 10 of the present embodiment, when the switch 64 shown in FIG. 1 is switched to the "jack deployment" side, the valve 54 is switched in the air supply direction by the control device 62. As a result, the air supply flow path is opened, and the compressor 50 and the airbag 32 communicate with each other. When the compressor 50 is activated in this condition, gases are supplied to the airbag 32 as shown in 6A. Then, the lower plate 30 is pushed down to deploy the jack 10. Therefore, the vehicle body 16 can be jacked up without separately preparing the air supply device or using the exhaust gas by connecting the muffler and the airbag 32 with a duct.

Further, when the switch 64 shown in FIG. 1 is switched to the "jack storage" side, the valve 54 is switched from the air supply direction to the exhaust direction by the control device 62. As a result, the exhaust flow path is opened, and the exhaust duct 52 and the airbag 32 are communicated with each other. As shown in FIG. 7, the gas is exhausted from the airbag 32 and the jack 10 is stored therein. That is, since the jack 10 is automatically deployed and stored, the occupant does not need to work outside the vehicle.

Further, the airbag 32 is bonded to the upper plate 28 and the lower plate 30. Thus, for example, even when the lower plate 30 lands on the ground G in a state of being inclined with respect to the floor surface of the vehicle body 16, the airbag 32 does not need to be displaced with respect to the upper plate 28 and the lower plate 30. Therefore, the vehicle body 16 can be securely jacked up by the inflated and deployed airbag 32.

SUPPLEMENTARY DESCRIPTION OF THE ABOVE EMBODIMENT

In the above embodiment, the jack 10 has been described as including the upper plate 28, the lower plate 30, and the constant load spring 34, but the present disclosure is not limited thereto, and the jack 10 may be constituted only by the upper plate 28 and the airbag 32. Further, for example, the airbag 32 may be pulled up by a mesh-like bag. Further, for example, the upper support portion may be formed in a lattice shape.

Further, for example, the lower support portion of the same material as the airbag 32 may be integrally provided at the corner of the bottom surface of the airbag 32, and the lower end portion of the wire 44 of the constant load spring 34 may be fixed to the lower support portion and pulled up to contract the airbag 32. Further, for example, the lower support portion of another member may be arranged in a cross shape, a radial shape, a mesh shape, or the like on the bottom surface of the airbag 32, and the end portion of the lower support portion may be pulled up by the constant load spring 34 to contract the airbag 32.

In the above-described embodiment, the lower plate 30 is biased toward the upper plate 28 by the constant load spring 34, but the present disclosure is not limited thereto, and the lower plate 30 may be biased toward the upper plate 28 by another method such as a wire spring.

Further, in the above embodiment, the lower plate 30 has been described as being larger than the inflated and deployed airbag 32 in the bottom view, but the present disclosure is not limited thereto, and the lower plate 30 may be formed smaller in the bottom view than the airbag 32.

Furthermore, in the above-described embodiment, a configuration has been described in which the gas is supplied to the airbag 32 and the gas is discharged from the airbag 32 via the ventilation portion 32B that serves as both the supply and exhaust. In the above description, the front ventilation duct 58 and the rear ventilation duct 60 are connected to the ventilation portion 32B. The present disclosure is not limited thereto, and two openings may be provided in the airbag 32 to completely separate the air supply flow path and the exhaust flow path.

In the above embodiment, the valve 54 is switched by the control device 62, but the present disclosure is not limited thereto, and the jack 10 may be deployed and stored by manually switching the valve by an occupant, for example.

Further, in the above-described embodiment, the airbag 32 is supplied with gas by the compressor 50, and the gas is discharged from the exhaust duct 52 whose one end 52A is opened. The present disclosure is not limited thereto, and a configuration may be adopted in which, for example, a gas is supplied to the airbag 32 using an air conditioner provided in a vehicle cabin, and the gas is returned to the air conditioner again when the air is exhausted.

Furthermore, the vehicle 14 may be used in the lunar plane. In this case, the gas may be supplied to the airbag 32 as a configuration in which, for example, a gas such as carbon dioxide discharged by an occupant is stocked in an air conditioner provided in a vehicle cabin. As a result, it is possible to effectively utilize the gas that is no longer required in the vehicle cabin. Further, by returning the gas discharged from the airbag 32 to the air conditioner again, it is not necessary to discharge the gas to the outer space.

In addition, a plurality of stacks is assumed during a mission on a lunar surface covered with regolith. Since the lunar surface is a severe and special environment, when an occupant goes out of a vehicle, it takes time to wear a space suit or the like, and it is accompanied by a risk of outboard activities. According to the jack 10 according to the above embodiment, since the jack 10 is automatically deployed and stored by the control device 62, even if the vehicle 14 is stacked on the moon surface, the occupant does not need to perform the outboard activities, and the jack can be repeatedly deployed and stored. When the jack 10 is used on the moon surface, a polyarylate-based high strength fiber or the like may be used as a material of the airbag.

Further, the jack 10 may be utilized for shock absorption during lunar landing. In this case, the control device 62 performs a process of switching the valve 54 in the air supply direction before the lunar surface of the vehicle 14 lands, and switching the valve 54 in the exhaust direction after the lunar surface of the vehicle 14 lands. As a result, the airbag 32 is deployed before landing on the lunar surface, and an impact is absorbed by the airbag 32 when landing on the lunar surface. Therefore, it is possible to suppress impact to the occupant and damage to the vehicle 14 at the time of lunar landing.

What is claimed is:
1. A jack comprising:
an upper support portion fixed to a lower part of a vehicle body;

an airbag provided below the upper support portion to be inflated and deployed by supply of gas;

a lower support portion provided below the airbag; and an urging portion that connects the upper support portion and the lower support portion and that urges the lower support portion toward the upper support portion side, wherein the airbag is deflated by exhaust of the gas, the urging portion urges the lower support portion toward the upper support portion side by a force smaller than a force acting on the lower support portion in a direction away from the upper support portion when the airbag is inflated and deployed, and the urging portion includes a constant load spring that urges the lower support portion toward the upper support portion side by a constant force, and the constant load spring comprises:

an upper drum, a lower drum, a wire wound around the upper drum, wherein the wire is connected to the lower support portion, and a metal thin plate wound around each of the upper drum and the lower drum, wherein the metal thin plate is separate from the wire.

2. The jack according to claim 1, wherein the lower support portion is sized to cover the inflated and deployed airbag in a bottom view.

3. A vehicle comprising:

the jack according to claim 1;

an air supply portion able to supply the gas to the airbag;

an exhaust portion able to exhaust the gas from the airbag; and a valve switchable in at least two directions including an air supply direction in which an air supply flow path for communicating the air supply portion and the airbag is opened and an exhaust direction in which an exhaust flow path for communicating the air exhaust portion and the airbag is opened.

4. A jack-up system comprising:

the jack according to claim 1;

an air supply portion able to supply the gas to the airbag;

an exhaust portion able to exhaust the gas from the airbag;

a valve switchable in at least two directions including an air supply direction in which an air supply flow path for communicating the air supply portion and the airbag is opened and an exhaust direction in which an exhaust flow path for communicating the air exhaust portion and the airbag is opened; and a control device that switches the valve to the air supply direction when the vehicle is in a stuck state, and switches the valve to the exhaust direction after deployment of the airbag is completed.

5. The jack-up system according to claim 4, wherein the control device switches the valve to the air supply direction prior to moon landing of a vehicle used on a moon surface, and switches the valve to the exhaust direction after the moon landing of the vehicle.

* * * * *